United States Patent [19]
Shipman et al.

[11] Patent Number: 6,041,385
[45] Date of Patent: *Mar. 21, 2000

[54] METHOD AND APPARATUS FOR PROTECTING DATA USING LOCK VALUES IN A COMPUTER SYSTEM

[75] Inventors: Mark S. Shipman, Hillsboro; Orville H. Christeson; Timothy E. W. Labatte, both of Portland, all of Oreg.

[73] Assignee: Intel Corporation, Santa Clara, Calif.

[ * ] Notice: This patent is subject to a terminal disclaimer.

[21] Appl. No.: 09/172,777

[22] Filed: Oct. 14, 1998

Related U.S. Application Data

[63] Continuation of application No. 08/623,930, Mar. 28, 1996, Pat. No. 5,852,736.

[51] Int. Cl.[7] .................................................. G06F 13/00
[52] U.S. Cl. ................................. 710/200; 710/36
[58] Field of Search .................................. 710/200, 240, 710/244, 36, 37, 40, 28; 707/2, 1, 9, 8; 711/100, 150, 151, 152, 163, 154; 345/520; 713/200, 2; 709/229, 219, 217, 225, 246; 714/27, 9

[56] References Cited

U.S. PATENT DOCUMENTS

| | | | |
|---|---|---|---|
| 5,557,674 | 9/1996 | Yeow ............................................ | 380/4 |
| 5,613,139 | 3/1997 | Brady ......................................... | 710/200 |
| 5,623,673 | 4/1997 | Gephardt et al. ........................... | 395/733 |
| 5,852,736 | 12/1998 | Shipman et al. ........................... | 710/200 |

OTHER PUBLICATIONS

"Desktop Management BIOS Specification," American Megatrends, Inc., et al., Sep. 27, 1995, pp. 1–53.

"Desktop Management Interface Specification," Digital Equipment Corp., et al., Mar. 5, 1993, 40 pgs.

*Primary Examiner*—Mehmet B. Geckil
*Attorney, Agent, or Firm*—Blakely, Sokoloff, Taylor & Zafman LLP

[57] ABSTRACT

A method and apparatus for protecting data using lock values in a computer system includes indicating that the computer system does not support locked accesses to the data. However, upon receipt of a request to write to the storage area where the data is contained, the present invention checks whether a lock value corresponding to the request matches a predetermined lock value. If the lock value matches the predetermined lock value, then the data is written to the storage area; otherwise, the storage area is left unmodified.

37 Claims, 4 Drawing Sheets

METHOD AND APPARATUS FOR PROTECTING DATA USING LOCK VALUES IN A COMPUTER SYSTEM

This is a continuation of application Ser. No. 08/623,930, filed Mar. 28, 1996, now U.S. Pat. No. 5,852,736.

BACKGROUND OF THE INVENTION

1. Field of the Invention

The present invention pertains to the field of data storage in a computer system. More particularly, this invention relates to protecting data stored in a computer system using lock values.

2. Background

Computer technology is continuously advancing, resulting in modern computer systems which provide ever-increasing performance. One result of this improved performance is an increased use of computer systems by individuals in a wide variety of business, academic and personal applications. With the increased use of and demand for computer systems, a large number of manufacturers, developers, and suppliers of computer systems, components, and software have come into existence to service the demand.

The large number of manufacturers, developers, and suppliers, combined with the flexibility afforded them due to the advances in technology, has resulted in a wide range of methods in which computer systems operate. Typically, in order for different components within a computer system to work together effectively, each must agree on certain specific operating parameters. Often, standards or specifications are adopted or agreed upon by various industries or groups of companies which define certain operating parameters. Thus, if two components comply with the same standard(s) or specification(s), then the two components should be able to work together effectively in the same system.

For example, one such standard is the Plug and Play Specification. A component which conforms to the Plug and Play Specification should work properly in a system which also complies with the Plug and Play Specification by simply connecting the component to the system. Components which do not comply with the Plug and Play Specification may require additional configuration steps to be taken by the user before they function properly.

Another current specification is the Desktop Management Interface (DMI) Specification. The DMI Specification provides, among other advantages, general purpose nonvolatile data areas which can be accessed to store various data by applications executing on the system. The DMI Specification, however, does not provide a mechanism to prevent an application from updating data stored in one of these general purpose nonvolatile data areas by another application. Thus, it would be beneficial to provide a mechanism for preventing unwanted updates to these general purpose nonvolatile data areas.

Additionally, in order to maintain compliance with the DMI Specification, any protection against unwanted updates to general purpose nonvolatile data areas must not violate the DMI Specification. Thus, it would be advantageous to provide a mechanism for preventing unwanted updates to the general purpose nonvolatile data areas which maintains compliance with the Desktop Management Interface Specification.

As will be described in more detail below, the present invention provides a mechanism for protecting data using lock values in a computer system that achieves these and other desired results which will be apparent to those skilled in the art from the description to follow.

SUMMARY OF THE INVENTION

A method and apparatus for protecting data using lock values in a computer system is described herein. The present invention includes indicating that a storage area in the computer system does not support locked accesses. However, upon receipt of a request to perform a locked access to the storage area, the present invention checks whether a lock value corresponding to the request is valid. If the lock value is valid, then access to the storage area is allowed.

DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

The present invention provides a mechanism for protecting data saved in a storage area. In order to modify the data in the storage area, an application provides a lock value. Upon receiving a request to modify the data in the storage area, the present invention checks whether the lock value is valid for the storage area. If the lock value is valid, then the present invention modifies the data in the storage area as requested. However, if the lock value is not valid, then the present invention leaves the data unchanged.

Figure 1:
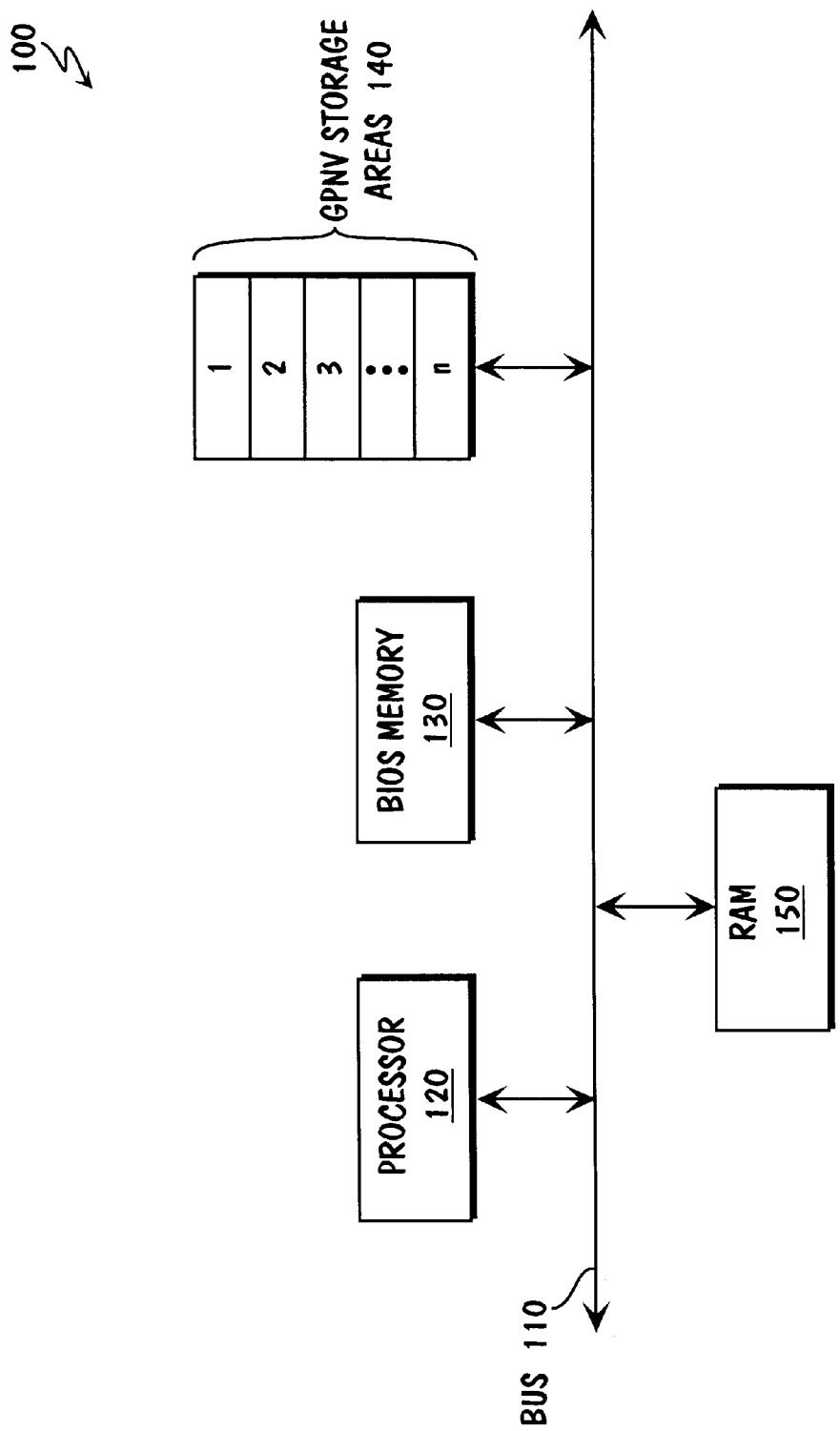
FIG. 1 is a block diagram showing a portion of a computer system in accordance with one embodiment of the present invention.

FIG. 1 is a block diagram showing a portion of a computer system in accordance with one embodiment of the present invention. A bus 110, a processor 120, a basic input output system (BIOS) memory 130, general purpose nonvolatile (GPNV) data storage 140, and a random access memory (RAM) 150 are interconnected as shown. The BIOS memory 130 stores a sequence of instructions (referred to as the BIOS) which allows the processor 120 to input data from and output data to input/output (I/O) devices (not shown) in the computer system 100, such as display devices and mass storage devices. In one embodiment, when the system 100 is reset, the contents of BIOS memory 130 are copied into RAM 150 for access by the processor 120. Alternatively, processor 120 may access the BIOS memory 130 directly via bus 110. The BIOS memory 130 can be any of a wide variety of conventional nonvolatile data storage devices, such as a read only memory (ROM), Flash memory, an erasable programmable read only memory (EPROM) or an electrically erasable programmable read only memory (EEPROM).

In one embodiment of the present invention, the BIOS stored in BIOS memory 130 is compliant with the Desktop Management BIOS Specification version 2.0, published Sep. 27, 1995, available from Intel Corporation of Santa Clara, Calif. The Desktop Management BIOS Specification includes a Desktop Management Interface (DMI). One aspect of DMI is the use of general-purpose nonvolatile (GPNV) data areas, shown in FIG. 1 as GPNV storage areas 140. The GPNV storage areas 140 are accessed by the processor 120 via the bus 110, however, the BIOS controls the access to the GPNV storage areas 140. Thus, when an application desires access to the GPNV storage areas 140, it must call one of the procedures provided by the BIOS. These procedures are described in more detail below.

Multiple GPNV storage areas 140 can be used in a computer system. The system 100 as shown includes n GPNV storage areas 140. In one implementation, n is equal to three.

Each of the GPNV areas 140 can be of any size. In one embodiment, one of the GPNV areas 140 is 128 bytes, a second is 256 bytes, and a third is 384 bytes. The GPNV storage areas 140 can be implemented using any of a wide variety of nonvolatile storage devices, such as blocks of Flash memory cells, EEPROMs, battery-backed complimentary metal oxide semiconductor (CMOS) cells, etc.

The GPNV storage areas 140 can be used to store any of a wide variety of information. In one embodiment, the GPNV storage areas 140 are used to store data relating to the identification of hardware components in the system 100. For example, this identification can include the serial numbers and model numbers of each piece of hardware (e.g., display devices, mass storage devices, multimedia cards, etc.) in the system 100.

DMI provides for locked access to the GPNV storage areas 140. According to DMI, an application which desires to write to one of the storage areas 140 first reads from the storage area. If locked accesses are supported by the BIOS, then the BIOS generates a lock value and returns that lock value to the calling application. Then, in order to write to the GPNV area, the calling application writes to the storage area and provides the lock value it received from the BIOS. Failure to provide the proper lock value results in the BIOS denying the calling application access to the storage area. However, if locked accesses are not supported by the BIOS, then the BIOS returns a value of −1 to indicate locked accesses to the GPNV storage areas 140 are not supported. Subsequent attempts to write to the GPNV storage areas 140 can then be either accepted by the BIOS without checking any lock values, or can be rejected.

It should be noted that DMI does not require GPNV storage areas to be supported. However, if the GPNV storage areas are supported, then it is required that the BIOS returns a value of −1 to indicate locked accesses are not supported, and that the BIOS allows write access to the GPNV area if the proper password is supplied.

In one embodiment, the present invention is implemented through a sequence of instructions executed on the processor 120. Initially, the sequence of instructions is stored in the BIOS memory 130. When the computer system is reset, the instructions are copied from the BIOS memory 130 into the RAM 150 and then accessed and executed by the processor 120. In an alternate embodiment, the sequence of instructions is stored on another nonvolatile memory device which is part of or is coupled to the system 100, such as a hard disk, an optical disk, or a removable floppy disk. The sequence of instructions can be loaded into the RAM 150 after an initial portion of the BIOS which includes instructions on how to access the memory device (e.g., the hard disk) has been loaded into the RAM 150.

Figure 2:
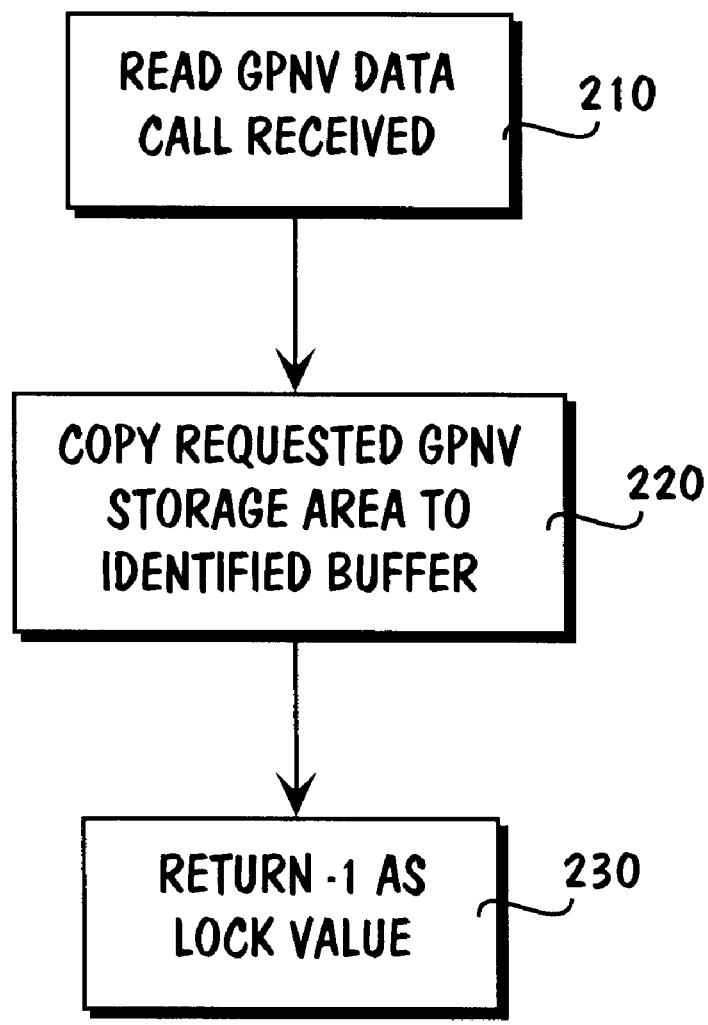
FIG. 2 is a flowchart showing the steps used to read data from a storage area according to one embodiment of the present invention.

FIG. 2 is a flowchart showing the steps used to read data from a storage area according to one embodiment of the present invention. A Read GPNV data call is first received by the BIOS, step 210. The Read GPNV data call is made by an application to access one of the GPNV areas 140. In one implementation, the calling application includes an identifier or "handle" identifying which one of the GPNV storage areas 140 is being accessed, as well as a pointer to a data buffer where the data from the identified GPNV storage area 140 should be placed.

Upon receipt of the Read GPNV data call, the BIOS provides the identified GPNV storage area to the requesting application by copying the data in the identified GPNV storage area to the data buffer identified by the calling application, step 220. It should be noted that in this embodiment any application can read the GPNV storage areas 140; the lock values do not prohibit reading from the GPNV storage areas 140.

The present invention then returns a value of −1 as a lock value to the calling application, step 230. Typically, the lock values in DMI are used in a multi-tasking environment to ensure that only one of multiple applications being executed concurrently is accessing a particular storage area at any one time. Thus, the typical response to a Read GPNV data call is to provide the data in the storage area and a lock value. The lock value is either a −1, which indicates locks to the storage areas 140 are not supported by the computer system, or a value of zero or greater which can be used by the application to write data to that storage area at a later time as discussed above. Thus, according to the method of FIG. 2, the calling application is informed that the computer system does not support locking. This indication, however, prevents the calling application from attempting to write to the GPNV storage area in the typical DMI manner.

In one embodiment, the Read GPNV data call is Function 56h of the Plug and Play BIOS. For more information on the Plug and Play BIOS, the reader is directed to the Plug and Play BIOS Specification, Version 1.0A, published May 5, 1994, available from Intel Corporation of Santa Clara, Calif. As parameters for the Read GPNV data call, the application provides a handle identifying which GPNV storage area is to be read and the address of a buffer into which the GPNV data is to be placed. In one implementation, the calling application also provides a lock value of zero when making a Read GPNV data call.

Figure 3:
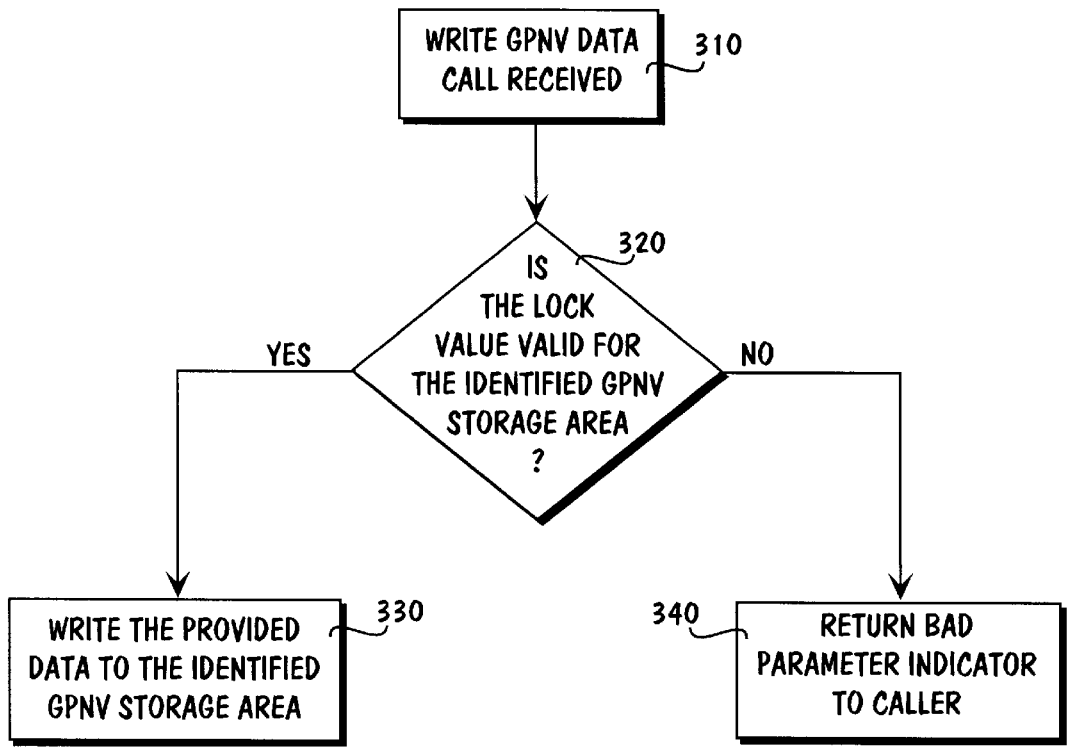
FIG. 3 is a flowchart showing the steps used to write data to a storage area according to one embodiment of the present invention.

FIG. 3 is a flowchart showing the steps used to perform a locked write of data to a storage area according to one embodiment of the present invention. A Write GPNV data call is first received by the BIOS, step 310. The Write GPNV data call is made by an application to access one of the GPNV storage areas 140. In one implementation, the calling application includes an identifier or "handle" identifying which one of the GPNV storage areas 140 is being accessed, as well as a lock value for the GPNV area being accessed.

Upon receipt of the Write GPNV data call, the present invention checks whether the lock value provided with the request is valid for the identified GPNV storage area, step 320. In one implementation, this determination is made by checking whether the lock value provided with the request matches one or more predetermined lock values. If the lock value provided with the request is valid for the identified GPNV storage area, then the data provided with the request is written into the identified GPNV storage area, step 330. However, if the lock value provided with the request is not valid for the identified GPNV storage area, then the data provided with the request is not written into the identified GPNV storage area and a bad parameter indicator is returned to the calling application, step 340. Thus, the lock value(s) provide a password-type protection to the GPNV storage areas 140 of FIG. 1.

Thus, the present invention maintains compliance with DMI by returning a −1 in response to a read to one of the GPNV storage areas 140 to indicate that locked access to the GPNV storage areas are not supported, and by allowing write access to the GPNV area if the proper lock value is supplied by the calling application.

In one embodiment, the Write GPNV data call is Function 57h of the Plug and Play BIOS mentioned above. As parameters for the Write GPNV data call, the application provides a handle identifying which GPNV storage area is trying to be written to, the address of a buffer containing the data to be written to the GPNV storage area, and a lock value.

It is to be appreciated that multiple predetermined lock values can correspond to a single data area of the GPNV storage areas 140. In this situation, each of the multiple predetermined lock values are checked by the present invention in determining whether the lock value provided with a Write GPNV data request is valid for the area. It is also to be appreciated that a single predetermined lock value can correspond to multiple data areas of the GPNV storage areas 140.

In one embodiment, the predetermined lock value(s) used by the present invention and an indicator of its corresponding GPNV storage area(s) are embedded-(e.g., hard-coded) in the sequence of instructions stored in the BIOS memory 130. In an alternate embodiment, the predetermined lock value is stored in a reprogrammable nonvolatile storage device (such as a Flash memory) coupled to the bus 110.

In one embodiment of the present invention, each lock value is a two-byte value. It is to be appreciated, however, that the lock values can be of any size.

Figure 4:
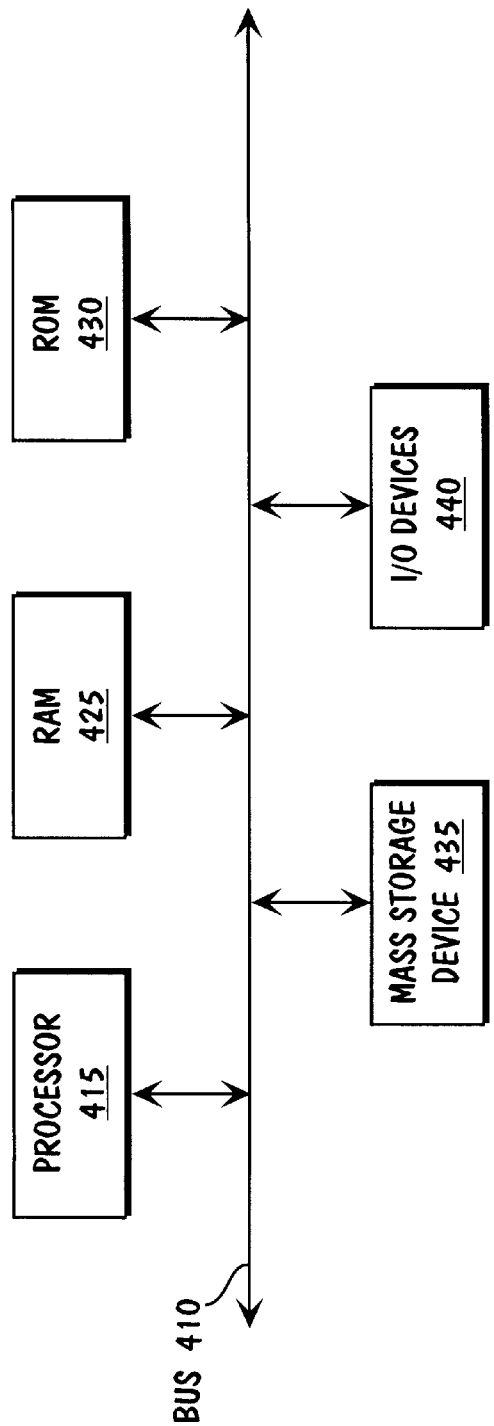
FIG. 4 is a block diagram of a computer system such as may be used with one embodiment of the present invention.

FIG. 4 is a block diagram of a computer system such as may be used with one embodiment of the present invention. A system 400 is shown comprising a bus or other communication device 410 for communicating information to and from the processor 415. The processor 415 is for processing information and instructions. In one implementation, the present invention includes an Intel® architecture microprocessor as the processor 415; however, the present invention may utilize any type of microprocessor architecture. In one embodiment, the bus 410 includes address, data and control buses. The system 400 also includes a random access memory (RAM) 425 coupled with the bus 410 for storing information and instructions for the processor 415, a read only memory (ROM) 430 coupled with the bus 410 for storing static information and instructions for the processor 415, a mass storage device 435 such as a magnetic or optical disk and disk drive coupled with the bus 410 for storing information and instructions for the processor 415, and input/output (I/O) devices 440 coupled with the bus 410 which input and output data and control information to and from the processor 415. The I/O devices 440 include, for example, a display device, an alphanumeric input device including alphanumeric and function keys, and a cursor control device. A hard copy device such as a plotter or printer may also be included in the I/O devices 440 for providing a visual representation of computer images.

In an alternate embodiment, the bus 410 is coupled to a separate I/O bus (not shown), such as a Peripheral Component Interconnect (PCI) bus, which is coupled to the bus 410 via a bus bridge. In this alternate embodiment, the I/O devices 440 are coupled to the I/O bus rather than the bus 410.

It is to be appreciated that certain implementations of the system 400 may include additional processors or other components. Furthermore, certain implementations of the present invention may not require nor include all of the above components. For example, I/O devices 440 may not include a display device.

In one embodiment of the present invention, each of the GPNV storage areas 140 of FIG. 1 is protected using a predetermined lock value(s), as described above. In an alternate embodiment, some of the GPNV storage areas 140 are protected using a predetermined lock value(s), while other GPNV storage areas 140 are treated in the typical manner provided for by DMI, where any of the applications can read the GPNV storage area and obtain a lock value for that area. In this alternate embodiment, which of the GPNV storage areas 140 are protected using the predetermined lock value(s) is encoded in the sequence of instructions stored in the BIOS memory 130.

In the discussions above, the present invention is described with reference to DMI and the Desktop Management BIOS Specification. It is to be appreciated, however, that the present invention is not limited to computer systems operating in accordance with the Desktop Management BIOS Specification or with DMI, but is also applicable to similar systems with a BIOS which supports lock values in substantially the same manner as DMI.

In an alternate embodiment of the present invention, the GPNV areas 140 of FIG. 1 are volatile storage devices rather than nonvolatile storage devices. The present invention operates as described above, however, any data to be maintained in the storage areas 140 must be re-written to the areas 140 each time power is re-applied to the system.

In another alternate embodiment of the present invention, the lock values are used for reading from the GPNV storage areas in an analogous manner to writing to the GPNV storage areas described above. In this alternate embodiment, any requests to read a GPNV storage area include a lock value. If the lock value provided by the request is valid for the identified GPNV storage area, then the data in the GPNV storage area is copied to the buffer identified by the requesting application. However, if the lock value provided by the request is not valid for the identified GPNV storage area, then the data in the GPNV storage area is not provided to the requesting application.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, a method and apparatus for protecting data using lock values in a computer system has been described.

What is claimed is:

1. A method for protecting a storage area in a computer system, the method comprising:

indicating that the storage area does not support locked accesses;

receiving a request to perform a locked access write to the storage area;

checking whether a first lock value corresponding to the request matches a predetermined lock value; and writing data corresponding to the request to the storage area if the first lock value matches the predetermined lock value.

2. The method of claim 1, wherein the receiving comprises:

receiving a storage area write call;

receiving the first lock value;

receiving data corresponding to the storage area write call; and receiving an identifier which identifies the storage area.

3. The method of claim 1, wherein the receiving comprises receiving a desktop management interface-compatible write request to a general purpose nonvolatile storage area.

4. The method of claim 1, further comprising:

receiving a request to read the storage area;

providing data from the storage area; and providing an indicator that the computer system does not support locking of the storage area.

5. The method of claim 1, wherein the indicating, receiving, checking, and writing are carried out by instructions that are contained in a BIOS.

6. The method of claim 1, wherein the indicating is in response to a received read request to read the storage area.

7. A method for protecting a nonvolatile storage area in a computer system, wherein the computer system is compatible with a desktop management interface BIOS specification, wherein the method comprises the computer-implemented steps of:

(a) indicating that the computer system does not support locked writes to the nonvolatile storage area;

(b) receiving a request to perform a locked write to the nonvolatile storage area;

(c) checking whether a first lock value corresponding to the request is valid based on a predetermined lock value; and (d) writing data corresponding to the request to the nonvolatile storage area if the first lock value is valid.

8. The method of claim 7, wherein the receiving step (b) comprises the steps of:

receiving a nonvolatile storage area write call;

receiving the first lock value;

receiving data corresponding to the nonvolatile storage area write call; and receiving an identifier which identifies the nonvolatile storage area.

9. The method of claim 7, wherein the receiving step (b) comprises receiving a write request to a general purpose nonvolatile storage area of the computer system.

10. The method of claim 7, further comprising the steps of:

receiving a request to read the nonvolatile storage area;

providing data from the nonvolatile storage area; and providing an indicator that the computer system does not support locking of the nonvolatile storage area.

11. The method of claim 10, wherein the indicator comprises a second lock value.

12. The method of claim 7, wherein the indicating is in response to a received read request to read the nonvolatile storage area.

13. A computer-readable medium having stored thereon a plurality of instructions, the plurality of instructions including instructions which, when executed by a processor, cause the processor to:

indicate that a storage area does not support locked accesses;

receive a request to perform a locked write to the storage area;

check whether a lock value corresponding to the request matches a predetermined lock value; and write data corresponding to the request to the storage area if the lock value matches the predetermined lock value.

14. The computer-readable medium of claim 13, wherein the instructions which cause the processor to receive the request cause the processor to:

receive a storage area write call;

receive the lock value;

receive data corresponding to the storage area write call; and receive an identifier which identifies the storage area.

15. The computer-readable medium of claim 13, wherein the plurality of instructions is compatible with a desktop management interface BIOS specification.

16. The computer-readable medium of claim 13, wherein the predetermined lock value is embedded in the plurality of instructions.

17. The computer-readable medium of claim 13, wherein the plurality of instructions further causes the processor to:

receive a request to read the storage area;

provide data from the storage area; and provide an indicator that the processor does not support locking of the storage area.

18. The computer-readable medium of claim 13, wherein the plurality of instructions are contained in a BIOS.

19. An apparatus comprising:

logic to indicate that a storage area cannot be locked;

logic to receive a request to perform a locked write to the storage area;

logic to check whether a lock value corresponding to the request is valid; and logic to write data corresponding to the request to the storage area if the lock value is valid.

20. The apparatus of claim 19, wherein the logic to receive a request is further operative to:

receive a storage area write call;

receive the lock value;

receive data corresponding to the storage area write call; and receive an identifier which identifies the storage area.

21. The apparatus of claim 19, wherein the storage area comprises a general purpose nonvolatile storage area.

22. The apparatus of claim 19, wherein the logic to indicate, the logic to receive, the logic to check, and the logic to write are all compatible with a desktop management interface BIOS specification.

23. The apparatus of claim 19, wherein the logic to indicate that a storage area cannot be locked is to indicate, in response to a received read request to read the storage area, that the storage area cannot be locked.

24. A hardware-readable medium which stores a plurality of instructions, the plurality of instructions including instructions which, when executed by a processor, cause the processor to:

indicate that a storage area does not support locked accesses;

receive a request to perform a locked access to the storage area;

check whether a lock value corresponding to the request is valid; and allow access to the storage area if the lock value is valid.

25. The hardware-readable medium of claim 24, wherein the plurality of instructions further cause the processor to leave the storage area unmodified if the lock value is not valid.

26. The hardware-readable medium of claim 24, wherein the plurality of instructions are contained in a BIOS.

27. A method comprising:

indicating that a storage area does not support locked accesses;

receiving a request to perform a locked access to the storage area;

checking whether a lock value corresponding to the request is valid; and allowing access to the storage area if the lock value is valid.

28. The method of claim 27, wherein the receiving comprises receiving a request to perform a locked access write.

29. A method comprising:

accessing a storage area;

receiving an indication, in response to the accessing, that locked accesses to the storage area are not supported; and making a locked access request to the storage area accompanied by a lock value.

30. The method of claim 29, wherein the accessing a storage area comprises making a read request to read the storage area.

31. The method of claim 29, wherein the making a locked access request to the storage area comprises making a request to perform a locked access write to the storage area.

32. The method of claim 29, wherein the receiving an indication comprises receiving the indication from a BIOS, wherein the BIOS includes logic to indicate that locked accesses to the storage area are not supported, to check whether the lock value is valid, and to allow access to the storage area if the lock value is valid.

33. A hardware-readable medium which stores a first plurality of instructions, the first plurality of instructions including instructions which, when executed by a processor, cause the processor to:

access a storage area;

receive an indication, in response to the access, that locked accesses to the storage area are not supported; and make a locked access request to the storage area accompanied by a lock value.

34. The hardware-readable medium of claim 33, wherein the instructions which cause the processor to access a storage area comprise instructions to cause the processor to make a read request to read the storage area.

35. The hardware-readable medium of claim 33, wherein the instructions which cause the processor to make a locked access request to the storage area comprise instructions to cause the processor to make a request to perform a locked access write to the storage area.

36. The hardware-readable medium of claim 33, wherein the instructions which cause the processor to receive an indication comprise instructions to cause the processor to receive the indication from a BIOS, wherein the BIOS includes a second plurality of instructions, the second plurality of instructions including instructions which, when executed by the processor, cause the processor to indicate that locked access to the storage area is not supported, to check whether the lock value is valid, and to allow access to the storage area if the lock value is valid.

37. A computer system comprising:

a processor;

a first hardware-readable medium having stored therein a first plurality of instructions, the first plurality of instructions including instructions which, when executed by the processor, cause the processor to perform the steps of:
(a) indicating that a nonvolatile storage area does not support locked accesses;
(b) receiving a request to perform a locked access write to the nonvolatile storage area;
(c) checking whether a lock value corresponding to the request is valid; and
(d) writing data corresponding to the request to the nonvolatile storage area if the lock value is valid; and, a second hardware-readable medium having stored therein a second plurality of instructions, the second plurality of instructions including instructions which, when executed by the processor, cause the processor to perform the steps of:
(a) making a read request to read the nonvolatile storage area; and
(b) making a request to perform a locked access write to the nonvolatile storage area accompanied by a valid lock value, after the processor indicates that the nonvolatile storage area does not support locked accesses.

* * * * *